US006532699B1

(12) United States Patent
Franklin et al.
(10) Patent No.: US 6,532,699 B1
(45) Date of Patent: Mar. 18, 2003

(54) SLIDING GLASS DOOR GREENHOUSE

(76) Inventors: Regina Frances Franklin, 46 Atlatl La., Hedgesville, WV (US) 25427; Lawrence Ray Franklin, 46 Atlatl La., Hedgesville, WV (US) 25427

( * ) Notice: Subject to any disclaimer, the term of this patent is extended or adjusted under 35 U.S.C. 154(b) by 0 days.

(21) Appl. No.: 10/012,526

(22) Filed: Dec. 12, 2001

(51) Int. Cl.[7] .............................. E06B 1/38; A01G 9/16

(52) U.S. Cl. .............................. 52/29; 52/201; 52/207; 47/17; 49/409

(58) Field of Search .............................. 52/29, 64, 201, 52/207, 204.51, 243.1, 293.3; 47/17, 18, 29.3; 49/409, 410, 125; 312/138.1, 139.2, 245; 160/90, 101

(56) References Cited

U.S. PATENT DOCUMENTS

| | | | | |
|---|---|---|---|---|
| 1,983,806 A | * | 12/1934 | Norman | 47/18 |
| 2,074,872 A | * | 3/1937 | Thorin | 47/40 |
| 2,086,247 A | | 7/1937 | Thesen | |
| 2,805,518 A | | 9/1957 | Stanhope | |
| 2,931,578 A | | 4/1960 | Thompson | |
| 4,009,546 A | * | 3/1977 | Buck, Jr. | 52/201 |
| 4,044,504 A | * | 8/1977 | Nakada | 49/425 |
| 4,068,421 A | * | 1/1978 | Marovich | 47/17 |
| 4,187,649 A | * | 2/1980 | Chaffee | 312/140 |
| 4,242,833 A | | 1/1981 | Maes, Jr. | |
| 4,291,494 A | | 9/1981 | Knablein et al. | |
| 4,316,347 A | | 2/1982 | Smith | |
| 4,335,547 A | * | 6/1982 | Maxwell | 52/66 |
| 4,414,784 A | | 11/1983 | Masters | |
| 4,462,390 A | | 7/1984 | Holdridge et al. | |
| 4,505,066 A | | 3/1985 | Moore | |
| 4,713,909 A | | 12/1987 | Roper et al. | |
| 4,794,727 A | | 1/1989 | Smith | |
| 4,833,829 A | * | 5/1989 | Wilson | 49/426 |
| D308,495 S | * | 6/1990 | Honeycutt | D11/145 |
| 5,315,834 A | | 5/1994 | Garunts et al. | |
| 5,433,030 A | | 7/1995 | Lehman | |
| 5,448,853 A | | 9/1995 | Harman | |
| 5,488,801 A | | 2/1996 | Nix | |
| 5,598,665 A | * | 2/1997 | Guddas | 49/404 |
| 5,802,762 A | | 9/1998 | Stonecypher | |
| 6,029,398 A | | 2/2000 | Sporer | |
| 6,158,169 A | | 12/2000 | Goldburt et al. | |

FOREIGN PATENT DOCUMENTS

| | | | |
|---|---|---|---|
| JP | 54-38647 | * | 3/1979 |
| JP | 2000-320277 | * | 11/2000 |

* cited by examiner

*Primary Examiner*—Lanna Mai
*Assistant Examiner*—Winnie Yip

(57) ABSTRACT

A sliding glass door system includes a conventional sliding glass door, fixed glass door, and a sliding screen door in combination with a sliding glass door display case. All are mounted on the outside wall of a house to slide parallel to each other in the manner of conventional sliding glass door systems. The sliding glass door display case has a frame commensurate in size to the frame of the sliding glass door and has a dish-shaped body which extends outwardly in cantilever fashion from its frame. Shelves are provided within the body in order to display items placed on them through the sliding glass door and/or the fixed glass door. The sliding glass door display case is especially suited for use as a personal sliding glass door greenhouse.

46 Claims, 7 Drawing Sheets

SLIDING GLASS DOOR GREENHOUSE

BACKGROUND OF THE INVENTION

1. Field of The Invention

This invention relates to a display case in the form of a sliding glass door wherein the display case is particularly useful as a greenhouse. The disclosure is primarily directed to the usage of the sliding glass door display as a greenhouse, because many novel advantages flow therefrom, but it is for illustrative purposes only. Obviously, the structure of the invention is capable of housing any desired object, and while inventive as a greenhouse, it is not limited thereto.

2. Description of Related Art

When one thinks of greenhouses, the first image that comes to mind is of a long warehouse-like building at a nursery. While these may be in the majority, greenhouses come in many other sizes and shapes as well. Some greenhouses are attached to buildings, typically windows, as shown by Thesen (U.S. Pat. No. 2,086,247) and Thompson (U.S. Pat. No. 2,932,578), or are attached to entire side walls of houses (U.S. Pat. No. 4,462,390 to Holdridge et al.). They also have been designed to enclose apartment house balconies (U.S. Pat. No. 4,414,784 to Masters). Some are constructed separate from other structures in natural surroundings, such as embedded in berms (U.S. Pat. No. 2,805,518 to Stanhope) or mounted on permanent foundations (U.S. Pat. No. 4,242,833 to Maes, Jr.). Some are portable, intended for use indoors (U.S. Pat. No. 4,291,494 to Knablein et al., U.S. Pat. No. 4,505,066 to Moore, and U.S. Pat. No. 5,433,030 to Lehman). Others are essentially carts, small, portable greenhouses provided with wheels (U.S. Pat. No. 4,316,347 to A. Smith and U.S. Pat. No. 4,794,727 to K. Smith). So far as the inventors are aware, none are constructed in the form of a sliding glass door.

OBJECTS AND SUMMARY OF THE INVENTION

The present invention adds to the variety of available greenhouses by providing a small greenhouse which is a part of a sliding glass door system, allowing for advantages not enjoyed by prior greenhouses:

- it does not take up otherwise usable space, for being so close to the conventional sliding glass door structure, the area over the deck where it resides is not usually occupied by other objects, e.g., deck furniture;
- it does not require assembly in order to be used nor disassembly to be stored;
- it is easily slidable on the sliding glass door tracks from a position in which it is open and accessible to an out-of-the-way place of storage;
- the plants being grown are easily accessible when the sliding glass door greenhouse is in alignment with the opening provided through conventional sliding glass door structures and are confined to an essentially sealed box when the sliding glass door greenhouse is behind the fixed glass door; and
- being viewable through the large opening provided by sliding glass door structures, it provides a setting which enhances and is enhanced by the plants and flora being grown therein.

The present invention accomplishes the above by mounting the greenhouse on a sliding glass door frame, said greenhouse being slidable along a track provided in parallel with conventional sliding glass door tracks.

For home "gardeners" without green thumbs, said greenhouse can house silk plants, knick-knacks, statuary, or any other item desired to be displayed through or in association with the conventional sliding glass door system.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which.

DETAILED DESCRIPTION OF THE PREFERRED EMBODIMENT

Figure 1:
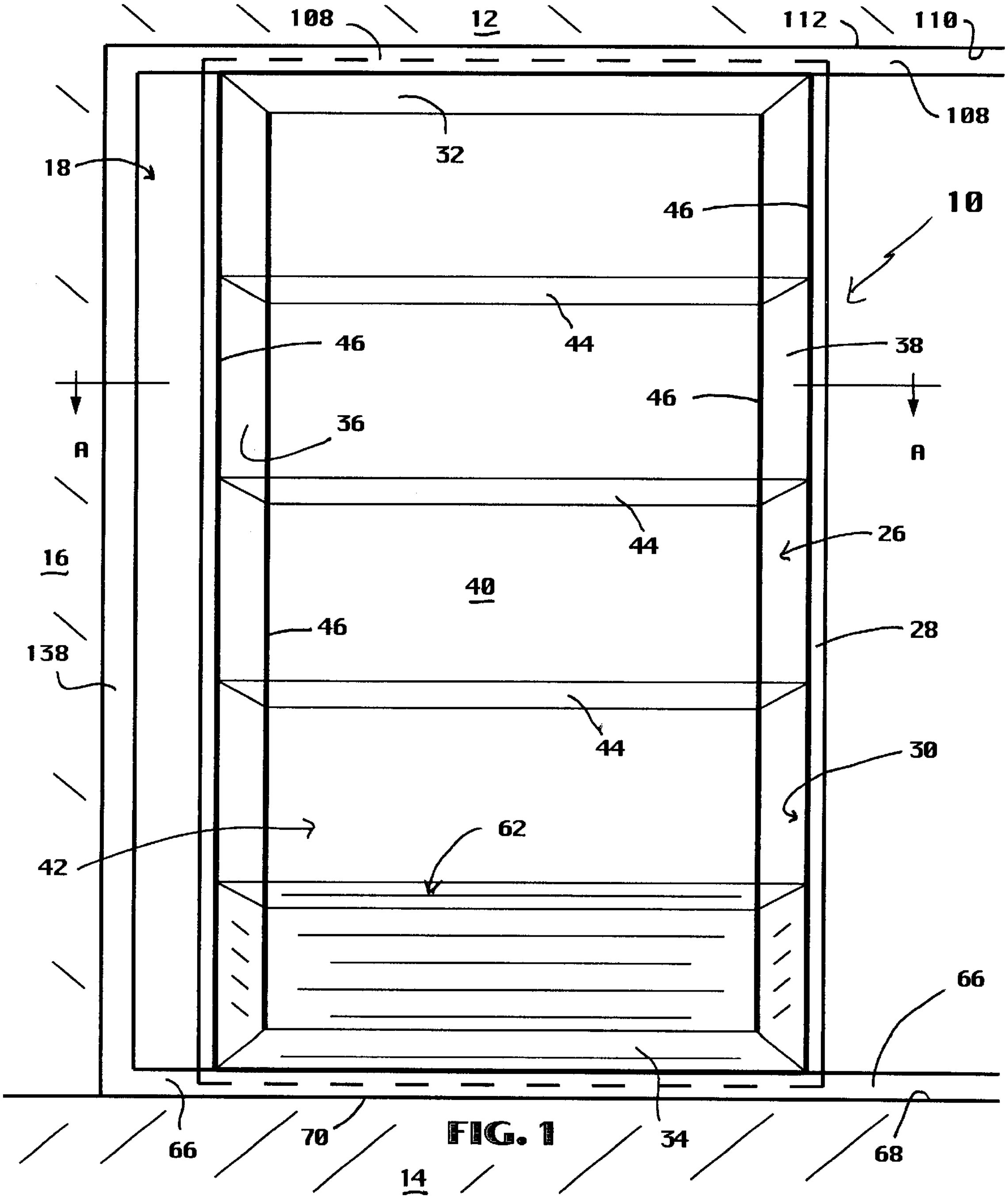
FIG. 1 is a front view of the preferred embodiment of the inventive sliding glass door greenhouse as seen from outside the house.

Turning to FIG. 1, a front view of the sliding glass door greenhouse 10 of the instant invention is shown. Greenhouse 10 is seen from outside the house 12 as if one were standing on deck 14. Outside wall 16 has an opening 18 therethrough for a sliding glass door system comprising a conventional fixed glass door 20, a conventional sliding glass door 22, and a conventional sliding screen door 24; see FIGS. 5–6. (In FIGS. 1 and 4, greenhouse 10 is shown alone, i.e., without the conventional sliding glass door 22, fixed glass door 20, and sliding screen door 24 being included, for clarity of depicting sliding glass door greenhouse 10.)

Figure 2:
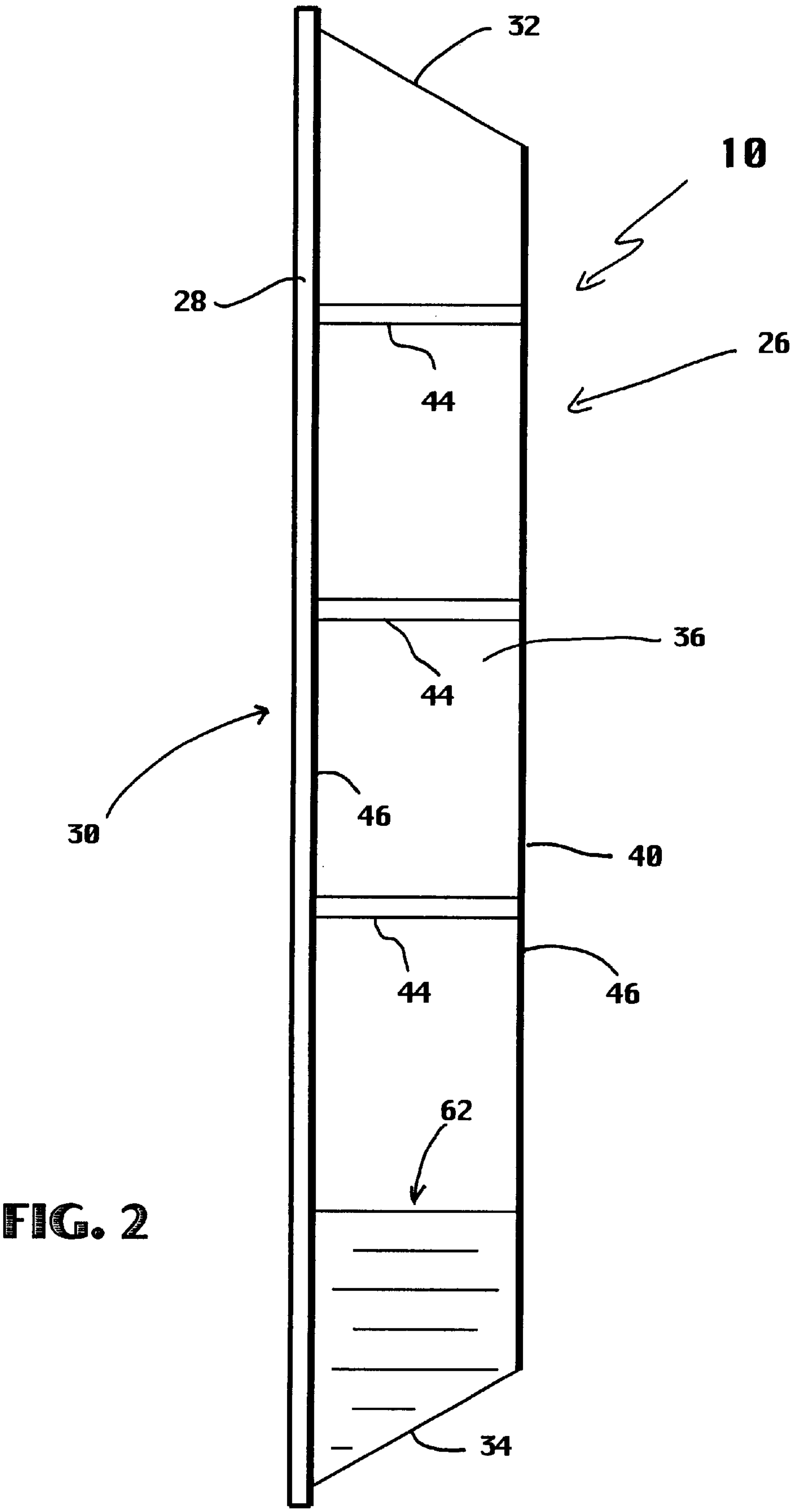
FIG. 2 is a side view of the greenhouse per se of FIG. 1.
Figure 3:
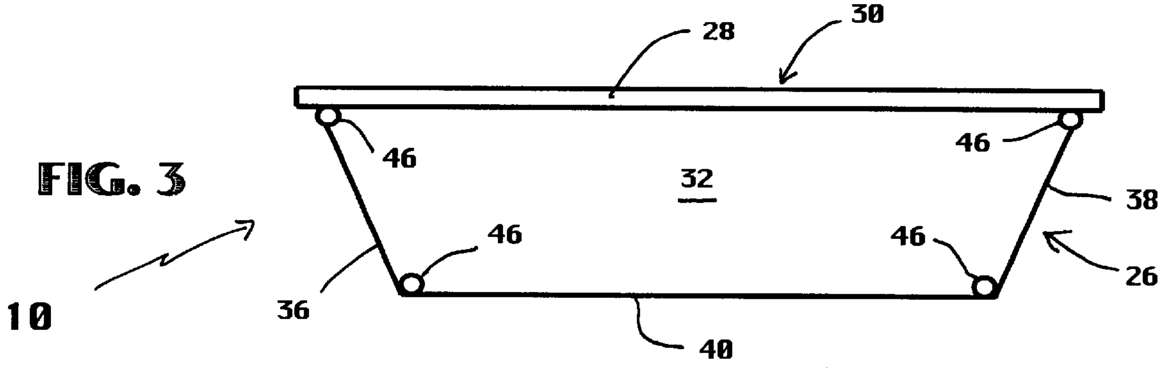
FIG. 3 is a top view of the greenhouse per se of FIG. 1.
Figure 4:
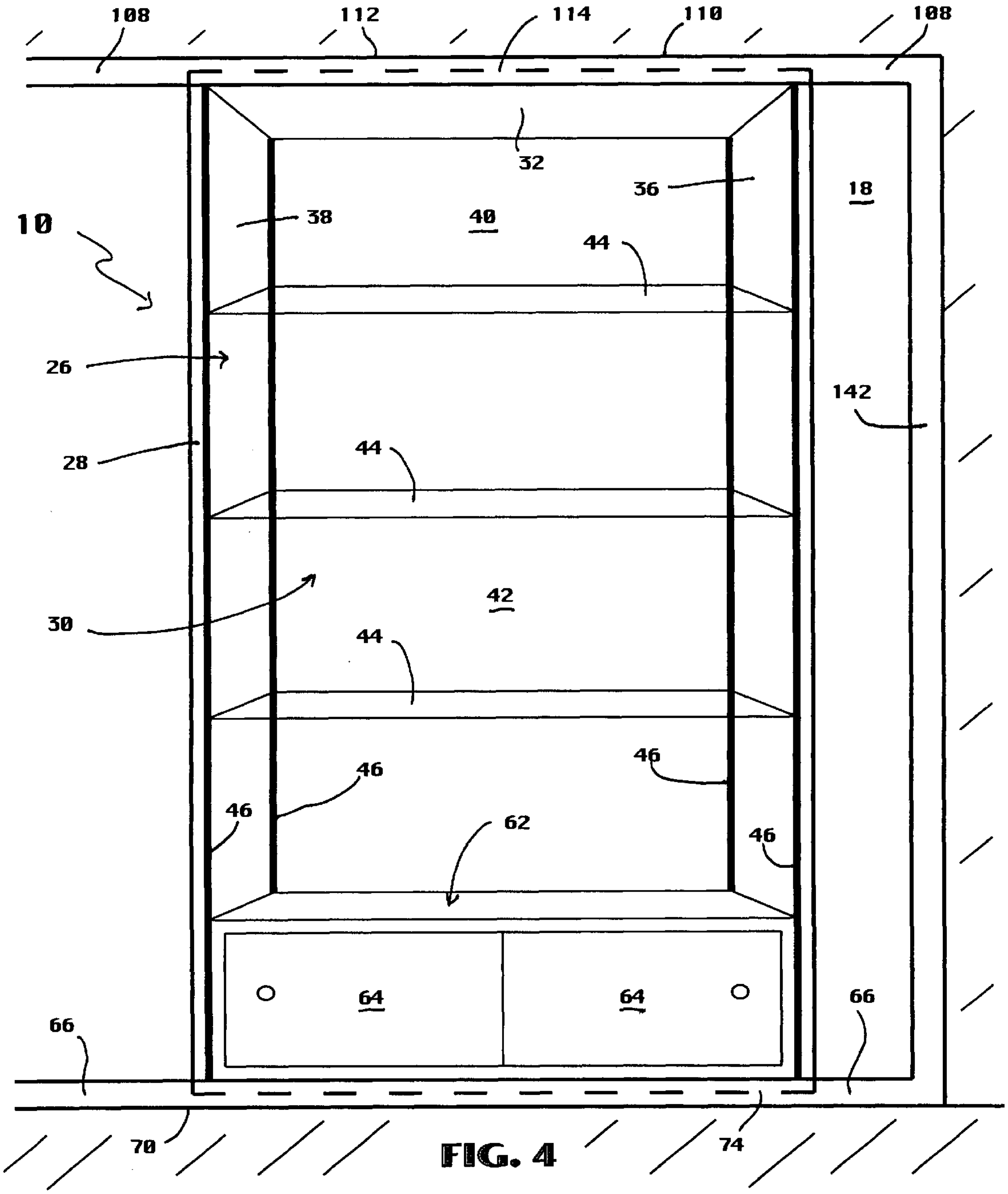
FIG. 4 is a back view of the greenhouse of FIG. 1 as seen from inside the house.

The overall shape of greenhouse 10 can best be seen in FIGS. 2 and 3. Greenhouse 10 comprises a body 26 fixed within a metal frame 28. Frame 28 is preferably formed in the manner of a conventional sliding glass door frame as a rectangular perimeter defining therethrough an opening 30 (FIGS. 1 and 4). A peripheral flange (not seen) of body 26 is secured within frame 28 in the manner conventional with sliding glass doors. Greenhouse 10 differs from a conventional sliding glass door 22 in that body 26 comprises a plurality of transparent panes 32, 34, 36, and 38 which extend outwardly from frame 28 in cantilever fashion forming, respectively, a top, bottom, and two sides of greenhouse 10. Preferably, panes 32, 34, 36, and 38 slope inwardly as seen in FIGS. 2 and 3 as this is the strongest configuration for body 26. The inward sloping angle for each of panes 32–38 is subject to change for aesthetic or structural reasons. A transparent, rectangular front pane 40 closes the outer extent of greenhouse 10. The junctures between panes 32–40 are shown as sharply angled corners for convenience in drafting only. Smoothly rounded corners are preferred. Further, each pane is depicted as being planar. Any or all could as well be arcuate to any degree desired. Frame 28 is made of extruded metal, e.g., aluminum or steel, which is rugged enough to support, without deformation, the weight of greenhouse 10 and any contents placed therein.

Frame 28 is dimensioned to correspond to the dimensions of the conventional fixed door 20, sliding glass door 22, and sliding screen door 24 with which it is to be associated.

Body 26 of greenhouse 10 preferably comprises a rigid, transparent, integral structure made of glass or plastic which can be manufactured by any known method, e.g., by molding or by the vacuum forming process. Other materials which can be used include acrylics, polycarbonates, styrenes, vinyls, fiberglass reinforced polyesters, and frosted glass. Alternatively, each substantially flat surface, i.e., each pane 32, 34, 36, 38, and 40, may be made separately of glass or plastic and joined together by metal or plastic frameworks (not shown). Also, panes of transparent, thermally insulating, multiple layered glazing material, such as are commercially available today in the United States under the trademarks "Thermopane" and "Superglass," are also contemplated as being within the purview of the invention. Such structures commonly comprise spaced parallel double (or triple or heat-mirrored double) glass glazing with intervening dry air or inert gas sealed therein.

Turning to FIGS. 1 and 4 which show front (outside) and back (inside) views, respectively, of sliding glass door greenhouse 10. It can be seen that panes 32–40 give body 26 a concave, dish-like shape enclosing an open interior 42 therewithin. Interior 42 is closed by panes 32–40 on all sides except through frame 28 from the back, that is, interior 42 is open toward the interior of house 12 for access from within house 12.

A plurality of shelves 44 (shown only diagrammatically in FIGS. 1–2 and 4) are adjustably supported within body 26. Shelves 44 are supported within interior 42 by any known shelf supports. For example, thickened vertical ribs 46 may be molded into body 28 along the vertical edges of side panes 36 and 38, as diagrammatically shown as circles when viewed on end in FIG. 3 and as elongated heavy lines in FIGS. 1–2 and 4. Apertures (not shown) for frictionally receiving conventional shelf support clips or pins 47 (FIG. 6) may be formed in ribs 46. Alternatively, ribs 46 may be conventional metal shelf support strips which are attached to body 26 in the locations shown.

Figure 7:
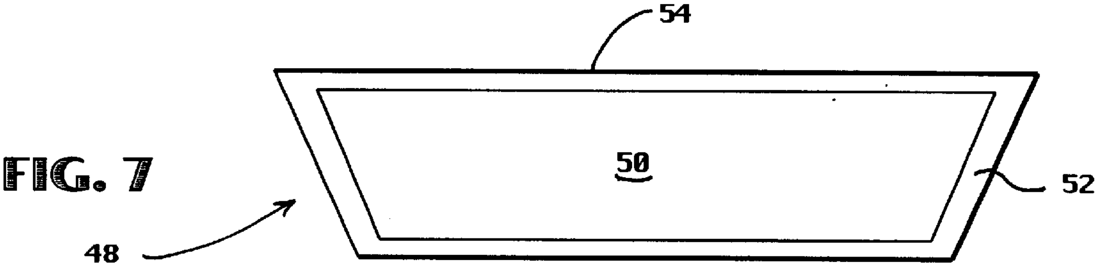
FIG. 7 is a top view of a preferred shelf for use with the invention of FIG. 1.
Figure 8:
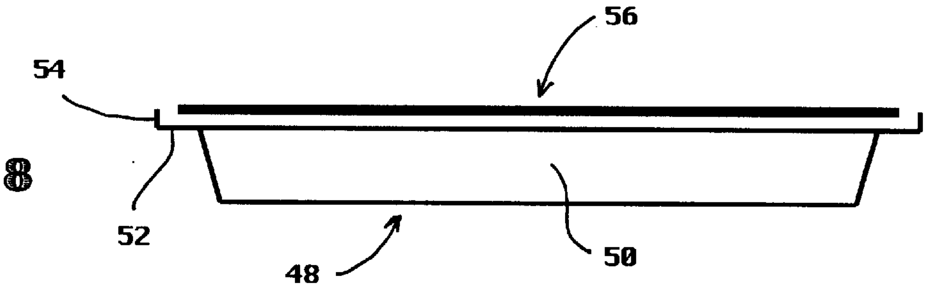
FIG. 8 is a front view of the shelf of FIG. 7 with the shelf grate of FIG. 9 placed therein.
Figure 9:
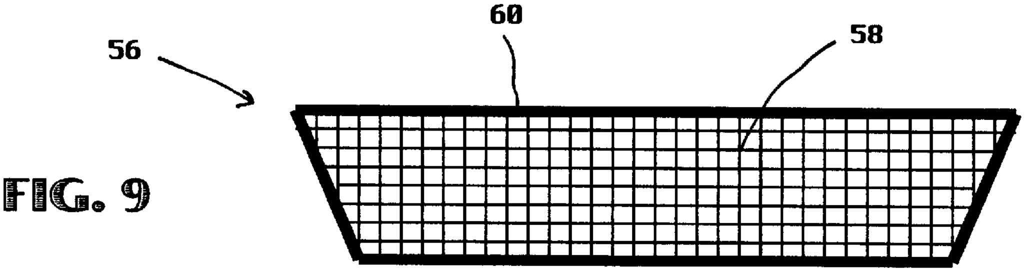
FIG. 9 is a top view of a shelf grate used with the shelf of FIG. 7.

Although any type of shelf can be used within greenhouse 10, transparent, translucent, or opaque, of glass, plastic, or metal, preferred embodiments are shown in FIGS. 7–9. FIG. 7 shows a top view of a first preferred embodiment, a pan 48 which has a perimetrical configuration congruent to that of the vertical cross-section of body 26 (FIG. 3), so that pan 48 will fit snugly within greenhouse 10. Pan 48 comprises a basin 50 surrounded by a peripheral flange 52 having an upstanding lip 54; see FIG. 8. Flange 52 rests on the aforementioned support clips 47. In use, pan 48 is partially filled with water into which are placed pots holding the type of plants which must sit in water. For plants which must be watered, but the water must be allowed to drain, a perforated shelf 56 (FIG. 9), such as one made of metal or plastic comprising a wire mesh 58 reinforced by a rigid frame 60, is placed on flange 52 within lip 54 (FIG. 8). Excess water will drain through mesh 58 into pan 48. Of course, solid shelves or shelves perforated other than by being made of wire mesh can be used in greenhouse 10.

Returning to FIGS. 1 and 4, a storage compartment 62 is preferably included within interior 42 for storage of tools and supplies. Doors 64 provide access to the interior of compartment 62. Preferably, storage compartment 62 is opaque to hide its contents. When intended only as a display case, sliding glass door greenhouse 10 can optionally be provided without storage compartment 62.

Figure 5:
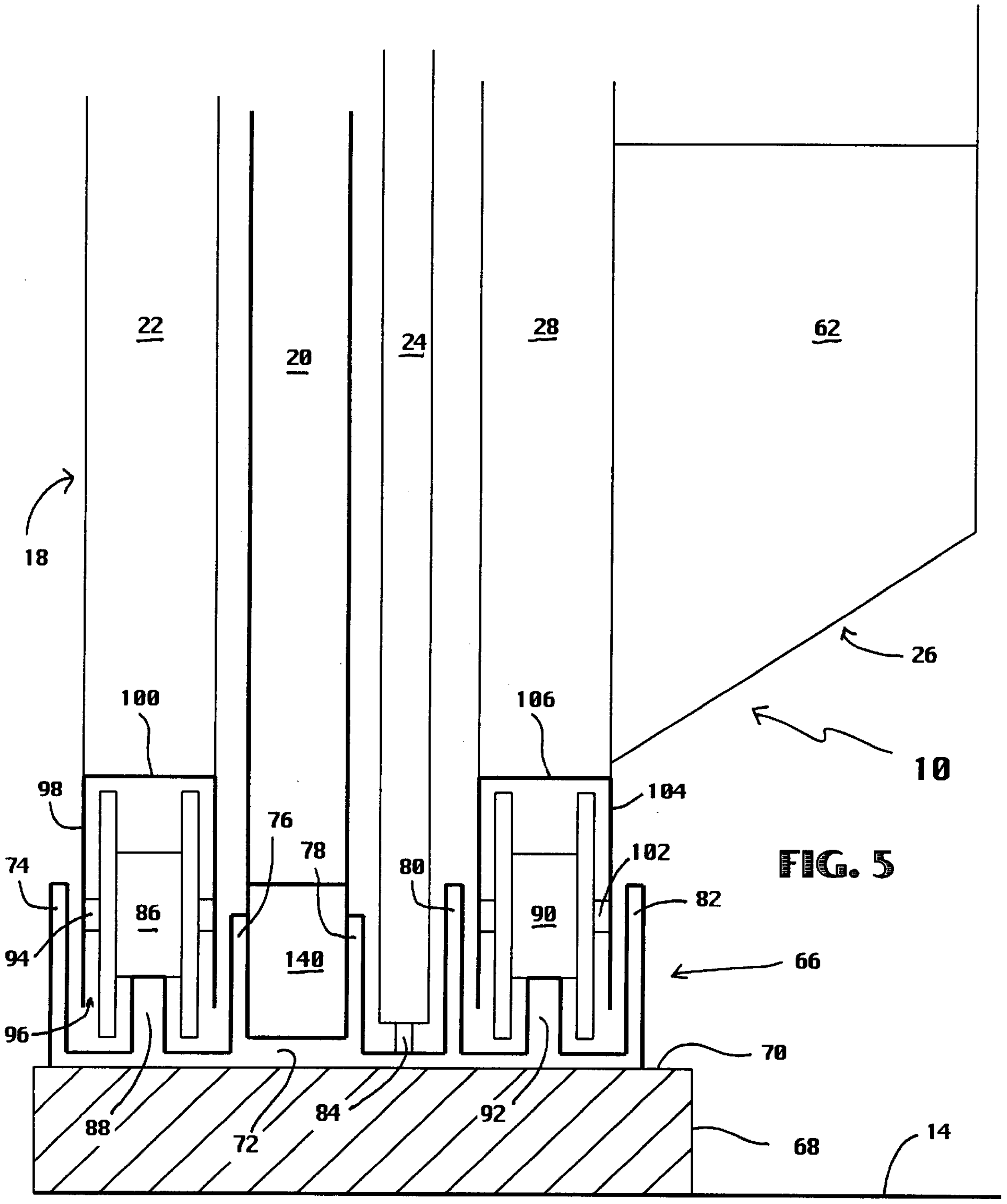
FIG. 5 is a side view of the lower supports of the sliding glass door, fixed glass door, sliding screen door, and sliding glass door greenhouse of FIG. 1.
Figure 6:
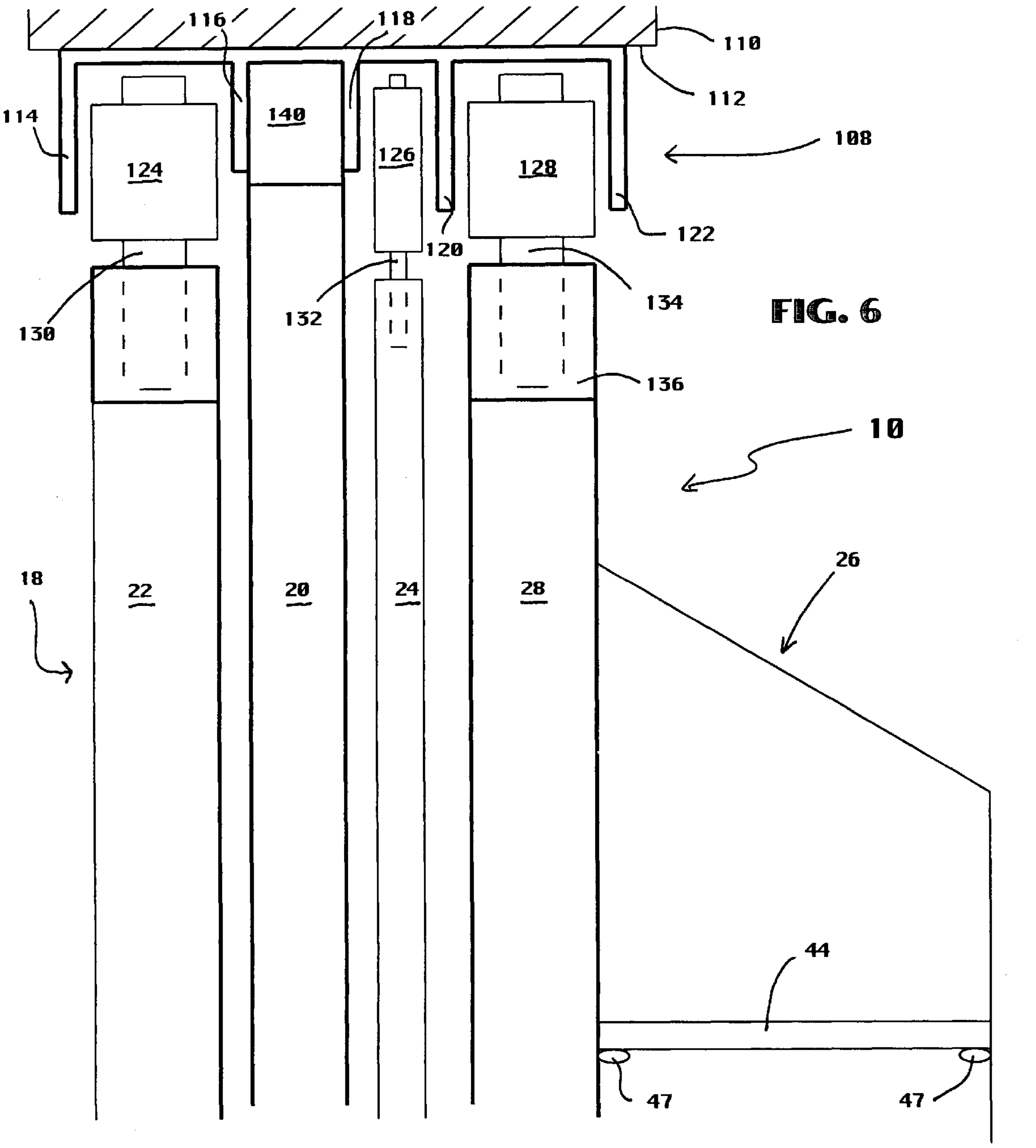
FIG. 6 is a side view of the upper guides of a sliding glass door, a fixed glass door, a sliding screen door, and the sliding glass door greenhouse of the invention of FIG. 1.

Referring to FIGS. 5 and 6, the preferred support system for guiding and supporting sliding glass door greenhouse 10 is disclosed.

A track 66 is attached to the lower jam 68 of sliding glass door opening 18 through wall 16 and extends from left to right across the entire bottom 70 of opening 18 (FIG. 1). Referring to FIG. 5, track 66 comprises a base 72 and a plurality of upstanding flanges 74, 76, 78, 80, and 82 which function as guides for conventional sliding glass door 22, fixed glass door 20, conventional screen 24, and frame 28 of sliding glass door greenhouse 10. Fixed door 20 is secured to flanges 76 and 78. Sliding screen door 24 includes a plurality of wheels 84 (only one being shown) spaced apart on its lower edge. Wheels 84 are shown as running in the recess between flanges 78 and 80, but it is within the scope of the inventive combination for wheels 84 to be rimmed wheels which ride on a rail, inasmuch as both are conventional. Sliding glass door 22 includes a plurality of rimmed wheels 86 (only one being shown) spaced along its bottom edge which are constrained to ride on a rail 88. Sliding glass door greenhouse 10 likewise includes rimmed wheels 90 (only one being shown) which are constrained to ride on a rail 92.

Wheels 86 are rotatable, preferably via roller bearings, on axles 94 which are non-rotatably fixed across the bight 96 of a U-shaped frame 98 along the bottom edge 100 of sliding glass door 22. Wheels 90 are also rotatable, again preferably via roller bearings, on axles 102 which are similarly non-rotatably fixed in a U-shaped frame 104 along the bottom edge 106 of sliding glass door greenhouse 10. A sufficient number of wheels 90, each of which are over-sized and ruggedly built, are spaced along bottom edge 106 to withstand the weight of sliding glass door greenhouse 10 and its contents.

An upper track 108 is mounted on the upper jam 110 of opening 18 and extends from left to right across the entire top 112 of opening 18 (FIG. 1). Both tracks 66 and 108 are preferably extruded metal, as is conventional in sliding glass door systems. Track 108 includes depending flanges 114, 116, 118, 120, and 122 which function as guides for rollers 124, 126, and 128 rotatable on vertically oriented axles 130, 132, and 134 affixed to sliding glass door 22, screen 24, and sliding glass door greenhouse 10, respectively. Fixed glass door 20 is fixed to flanges 116 and 118. Wheels 90 support the weight of sliding glass door greenhouse 10, but due to the cantilevered attachment of body 26 on frame 28, sliding glass door greenhouse 10 has a lateral component of force trying to tip sliding glass door greenhouse 10 over onto deck 14. Preferably, each of axles 134 of rollers 128 (only one shown in FIG. 6) are non-rotatably fixed within a solid metal block 136 integral with frame 28 of greenhouse 10. Rollers 128 run along the inner surface of depending flange 122 to prevent sliding glass door greenhouse 10 from toppling over. At least flanges 120 and 122 depend low enough to provide sufficient restraining surfaces for rollers 128. And, rollers 128 and their axles 134 are themselves strong enough to be adequate for the work required of them.

The functioning and resulting benefits of sliding glass door greenhouse 10 will be briefly explained.

Fixed glass door 20 is, of course, fixed to lower track 66, upper track 106, and a vertical side track 138 (FIG. 1) of opening 18, and, as is common, has a width such that it occupies approximately one half of opening 18. Conventional sliding glass door 22, screen 24, and sliding glass door greenhouse 10 are of commensurate width as fixed glass door 20, and all slide independently of each other, as is apparent from FIGS. 5 and 6.

When sliding glass door greenhouse 10 is slid to the same side as fixed door 20, it is out of the way, and the flowers and plants positioned therein are viewable through fixed door 20. Preferably, when screen 24 is also slid to the same side as fixed door 20, its perimetrical frame is substantially sealed by weatherstripping or otherwise (not shown) against both the frame 140 of fixed door 20 and frame 28 of sliding glass door greenhouse 10. This protects the flowers and plants in greenhouse 10 against wind and rain. The seals are not hermetical, however, so adequate circulation of air is provided to the flowers and plants therein.

When sliding glass door greenhouse 10 is slid to the end of opening 18 opposite from fixed door 20, metal frame 28 fits within a vertical side track 142 parallel with vertical side track 138 but at the opposite end of opening 18. When both sliding glass door 22 and sliding screen 24 are moved into register with fixed door 20, access is provided through opening 30 in frame 28 into interior 42 of body 26. The home gardener has the convenience of remaining within house 12 while tending the flowers and plants, a major benefit, especially during inclement weather. Closing screen 24 protects greenhouse 10, when in this position, from children and pets. Opening into the home provides greenhouse 10 with another benefit not provided by other greenhouses. During winter months, the heat within the house is supplied to greenhouse 10 as well, allowing greater versatility in the types of plants and flowers one can grow year-round. It is, therefore, preferable that frame 28 and vertical side track 142 (FIG. 4) include any complementary locking mechanism (not shown) common for sliding glass doors, so that the home can be secure while greenhouse 10 is open to the heat of the house.

It is clear that greenhouse 10 can be used as a display case without any structural modifications. Instead of displaying growing plants and flowers, many different items can be displayed by merely placing them on the shelves.

The description thus far has assumed greenhouse 10 is installed as an original unit designed to incorporate the sliding glass door greenhouse with the conventional sliding glass door system. That is, tracks 66 and 108 are constructed to integrally include the flanges and rails of both the conventional sliding glass door system and the sliding door greenhouse of the instant invention. In addition, however, sliding door greenhouse 10 can also be retrofit to existing sliding glass door systems by adding separate tracks for greenhouse 10, as will now be described relative to FIG. 10, where corresponding elements are labelled with the same reference numerals.

Figure 10:
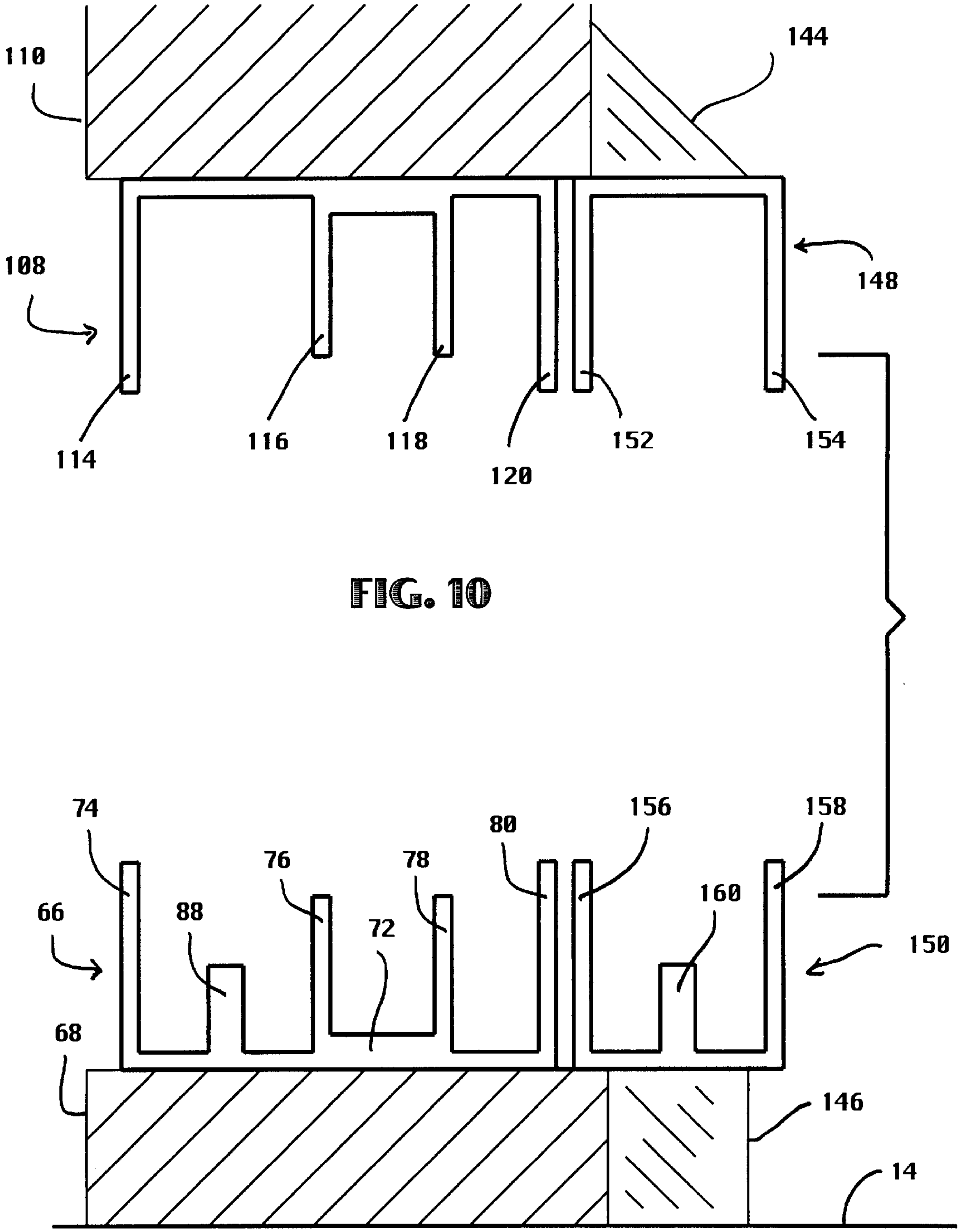
FIG. 10 is a side view of the upper and lower tracks of a retrofit unit as attached parallel to conventional sliding glass door upper and lower tracks.

Referring to FIG. 10, as in the FIGS. 1–9 embodiment, upper track 108 is mounted on upper jam 110, and lower track 66 is mounted on lower jam 68. A retrofit frame comprising a pair of retrofit side tracks (not shown) adjacent and parallel to vertical side tracks 138 and 142, respectively, an upper retrofit track 148, and a lower retrofit track 150 are installed around opening 18. Upper track 108 includes the same depending flanges 114, 116, 118, and 120 for guiding, respectively, roller 124 of sliding glass door 22, for affixing fixed glass door 20, and for guiding roller 126 of sliding screen 24; compare with FIG. 6. Lower track 66 includes the corresponding base 72 with rail 88 and upstanding flanges 74, 76, 78, and 80, for supporting rimmed wheels 86 of sliding glass door 22, for affixing fixed glass door 20, and for guiding wheels 84 of sliding screen door 24. This comprises, essentially, the tracks for conventional existing sliding glass door systems.

In order to retrofit the conventional system to accomodate the sliding glass door greenhouse 10, trim strips 144 and 146 are attached to upper jam 110 and lower jam 68, respectively, on the deck 14 side for supporting upper retrofit track 148 and lower retrofit track 150. Of course, as before, both upper and lower retrofit tracks 148 and 150, as well as trim strips 144 and 146, extend the full width of opening 18. Upper auxiliary track 148 includes two depending flanges 152 and 154 for guiding rollers 128 of sliding glass door greenhouse 10. Lower auxiliary track 150 includes two upstanding flanges 156 and 158 with an upstanding rail 160 positioned therebetween. Flanges 156 and 158 and rail 160 guide and support rimmed is wheels 90 of sliding glass door greenhouse 10 in the same manner as before.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is it intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

We claim as our invention:

1. A sliding glass door greenhouse, said sliding glass door greenhouse being adapted for moving along a sliding glass door track, said sliding glass door greenhouse comprising:

a frame, said frame comprising a top member, a bottom member, and a pair of side members connecting said top and bottom members, said frame being substantially planar and defining a perimeter around an opening;

a body, said body having a concave, dish-shaped portion enclosing an open interior therewithin accessible through said opening in said frame, said body comprising a plurality of panes fixed to said frame and extending outwardly therefrom in cantilever fashion forming a top, bottom, and two sides of said body and a front pane, said plurality of panes being joined together to close said concave portion of said body;

a plurality of supports rotatably mounted on said bottom member, said plurality of rotatable supports being substantially planar with said frame and providing the sole support of said sliding glass door greenhouse on said sliding glass door track; and a plurality of guides mounted on said top member, said plurality of guides being adapted to coact with said sliding glass door track to guide said top member.

2. The sliding glass door greenhouse of claim 1 wherein said plurality of rotatable supports comprises a plurality of wheels and said plurality of guides comprises a plurality of rollers which are substantially coplanar with said frame.

3. The sliding glass door greenhouse of claim 2 wherein said body further comprises a peripheral flange secured within said frame, said peripheral flange being integral with said top, bottom, and two sides of said body.

4. The sliding glass door greenhouse of claim 3 wherein at least some of said plurality of panes and said front pane are transparent.

5. The sliding glass door greenhouse of claim 3 wherein said peripheral flange, said plurality of panes, and said front pane are joined together by a framework made of a different material than said panes.

6. The sliding glass door greenhouse of claim 3 wherein said peripheral flange, said plurality of panes, and said front pane comprise a unitary structure.

7. The sliding glass door greenhouse of claim 6 wherein said peripheral flange, said plurality of panes, and said front pane are integrally joined together via smoothly rounded corners.

8. The sliding glass door greenhouse of claim 7 wherein said body is formed by the vacuum forming process.

9. The sliding glass door greenhouse of claim 6 wherein said body further comprises shelf supports extending vertically within said interior of said body.

10. The sliding glass door greenhouse of claim 9 wherein said shelf supports are ribs molded integrally with said body.

11. The sliding glass door greenhouse of claim 9 further comprising a plurality of shelves removably placed on said shelf supports.

12. The sliding glass door greenhouse of claim 11 wherein at least one of said shelves comprises a pan including an imperforate basin, a surrounding flange, and an upstanding lip.

13. The sliding glass door greenhouse of claim 12 further comprising a perforated shelf loosely fitted on said flange within said upstanding lip.

14. The sliding glass door greenhouse of claim 11 further comprising a storage compartment housed within said body.

15. The sliding glass door greenhouse of claim 1 wherein said body is made of one from the group of glass, plastics, acrylics, polycarbonates, styrenes, vinyls, fiberglass reinforced polyesters, frosted glass, and thermally insulating, multiple layered glazing material.

16. A sliding glass door system, comprising:

a sliding glass door track adapted for being mounted peripherally around an opening through a wall of a building;

a sliding glass door slidable along said track;

a fixed glass door fixed to said track;

a sliding screen door slidable along said track; and a sliding glass door display case slidable along said track, said sliding glass door display case comprising:

a frame, said frame having a top member, a bottom member, and a pair of side members connecting said top and bottom members, said frame being substantially planar and defining a perimeter around an opening;

a body, said body being fixed to said frame and extending outwardly therefrom in cantilever fashion, said body having a concave, dish-like shape enclosing an open interior therewithin accessible through said opening in said frame;

a plurality of supports rotatably mounted on said bottom member, said plurality of rotatable supports being substantially planar with said frame and providing the sole support of said sliding glass door display case on said sliding glass door track; and a plurality of guides mounted on said top member, said plurality of guides coacting with said sliding glass door track to guide said top member.

17. The sliding glass door system of claim 16 wherein said plurality of rotatable supports comprises a plurality of wheels and said plurality of guides comprises a plurality of rollers which are substantially coplanar with said frame.

18. The sliding glass door system of claim 17 wherein said body further comprises a peripheral flange secured within said frame.

19. The sliding glass door system of claim 18 wherein at least some of said plurality of panes and said front pane are transparent.

20. The sliding glass door system of claim 18 wherein said peripheral flange, said plurality of panes, and said front pane comprise a unitary structure.

21. The sliding glass door system of claim 20 wherein said plurality of panes and said front pane are integrally joined together via smoothly rounded corners.

22. The sliding glass door system of claim 21 wherein said body is formed by the vacuum forming process.

23. The sliding glass door system of claim 20 wherein said body further comprises shelf supports extending vertically within said interior of said body.

24. The sliding glass door system of claim 23 wherein said shelf supports are ribs molded integrally with said body.

25. The sliding glass door system of claim 17 wherein said track comprises:

a lower track and an upper track;

said lower track comprising a base, a plurality of upstanding flanges which function as guides for said sliding glass door, said fixed glass door, said sliding screen door, and said sliding glass door display case, and a plurality of rails for supporting at least said sliding glass door and said sliding glass door display case;

said upper track comprising a base and a plurality of depending flanges which function as guides for said sliding glass door, said fixed glass door, said sliding screen door, and said sliding glass door display case;

said fixed door being fixed to a pair of adjacent flanges in both said lower and upper tracks;

said sliding screen door being slidingly supported by said lower track base;

said sliding glass door including wheels which ride on one of said lower track rails; and said plurality of wheels of said sliding glass door display case riding on another of said lower track rails.

26. The sliding glass door system of claim 25 wherein said frame is sized corresponding to said sliding glass door.

27. A sliding glass door system, comprising:

a sliding glass door track adapted for being mounted peripherally around an opening through a wall of a building;

a sliding glass door slidable along said track;

a fixed glass door fixed to said track;

a sliding screen door slidable along said track; and a sliding glass door greenhouse slidable along said track, said sliding glass door greenhouse comprising:

a frame, said frame having a top member, a bottom member, and a pair of side members connecting said top and bottom members, said frame being substantially planar and defining a perimeter around an opening;

a body, said body being fixed to said frame and extending outwardly therefrom in cantilever fashion, said body having a concave, dish-shaped portion enclosing an interior therewithin accessible through said opening in said frame;

a plurality of supports rotatably mounted on said bottom member, said plurality of rotatable supports being substantially planar with said frame and providing the sole support of said sliding glass door greenhouse on said sliding glass door track; and a plurality of guides mounted on said top member, said plurality of guides coacting with said sliding glass door track to guide said top member.

28. The sliding glass door system of claim 27 wherein said sliding glass door greenhouse body is made of one from the group of glass, plastics, acrylics, polycarbonates, styrenes, vinyls, fiberglass reinforced polyesters, frosted glass, and thermally insulating, multiple layered glazing material.

29. The sliding glass door system of claim 27 wherein said plurality of rotatable supports comprises a plurality of wheels and said plurality of guides comprises a plurality of rollers which are substantially coplanar with said frame.

30. The sliding glass door system of claim 29 wherein said body further comprises a peripheral flange secured within said frame, said peripheral flange being integral with said top, bottom, and two sides of said body.

31. The sliding glass door system of claim 30 wherein at least some of said plurality of panes and said front pane are transparent.

32. The sliding glass door system of claim 30 wherein said peripheral flange, said plurality of panes, and said front pane are joined together by a framework made of a different material than said panes.

33. The sliding glass door system of claim 30 wherein said peripheral flange, said plurality of panes, and said front pane comprise a unitary structure.

34. The sliding glass door system of claim 33 wherein said peripheral flange, said plurality of panes, and said front pane are integrally joined together via smoothly rounded corners.

35. The sliding glass door system of claim 34 wherein said body is formed by the vacuum forming process.

36. The sliding glass door system of claim 33 wherein said body further comprises shelf supports extending vertically within said interior of said body.

37. The sliding glass door system of claim 36 wherein said shelf supports are ribs molded integrally with said body.

38. The sliding glass door system of claim 36 further comprising a plurality of shelves removably placed on said shelf supports.

39. The sliding glass door system of claim 38 wherein at least one of said shelves comprises a pan including an imperforate basin, a surrounding flange, and an upstanding lip.

40. The sliding glass door system of claim 39 further comprising a perforated shelf loosely fitted on said flange within said upstanding lip.

41. The sliding glass door system of claim 29 wherein said track comprises:

a lower track and an upper track;

said lower track comprising a base, a plurality of upstanding flanges which function as guides for said sliding glass door, said fixed glass door, said sliding screen door, and said sliding glass door greenhouse, and a plurality of rails for supporting at least said sliding glass door and said sliding glass door greenhouse;

said upper track comprising a base and a plurality of depending flanges which function as guides for said sliding glass door, said fixed glass door, said sliding screen door, and said sliding glass door greenhouse;

said fixed door being fixed to a pair of adjacent flanges in both said lower and upper tracks;

said sliding screen door including wheels supported by said base of said lower track;

said sliding glass door including wheels which ride on one of said rails of said lower track; and said plurality of wheels of said sliding glass door greenhouse riding on another of said rails of said lower track.

42. The sliding glass door system of claim 41 wherein said greenhouse frame is sized corresponding to said sliding glass door.

43. The sliding glass door system of claim 27 further comprising a storage compartment housed within said body.

44. A kit for retrofitting a sliding glass door greenhouse to a conventional sliding glass door system, said conventional sliding glass door system comprising a sliding glass door, a fixed glass door, and a sliding screen door, said sliding glass door, fixed glass door, and sliding screen door being supported and guided by a first lower track and a first upper track, said kit comprising:

a second lower track and a second upper track adapted to be mounted alongside said first lower track and said first upper track, respectively, said second lower track and said second upper track being adapted for receiving, supporting, and guiding a sliding glass door greenhouse, said sliding glass door greenhouse comprising:

a frame, said frame having a top member, a bottom member, and a pair of side members connecting said top and bottom members, said frame being substantially planar and defining a perimeter around an opening;

a body, said body having a concave, dish-shaped portion enclosing an open interior therewithin accessible through said opening in said frame, said body comprising a plurality of panes fixed to said frame and extending outwardly therefrom in cantilever fashion and forming a top, bottom, and two sides of said body, and a front pane, said plurality of panes and said front pane being integrally joined together to close said dish-shaped portion of said body, said body being adapted to support a plurality of shelves within said body;

a plurality of supports rotatably mounted on said bottom member, said plurality of rotatable supports being substantially coplanar with said frame and providing the sole support of said sliding glass door greenhouse on said second lower track; and a plurality of guides mounted on said top member, said plurality of guides being substantially coplanar with said frame and being adapted to coact with said second upper track to guide said top member.

45. The retrofitting kit of claim 44 wherein said plurality of rotatable supports comprises a plurality of wheels and said plurality of guides comprises a plurality of rollers.

46. The retrofitting kit of claim 45 wherein said body further comprises a peripheral flange secured within said frame, said peripheral flange, said plurality of panes, and said front pane comprising a unitary structure which are integrally joined together via smoothly rounded corners.

* * * * *